United States Patent [19]

Schiesterl

[11] 3,968,979
[45] July 13, 1976

[54] SAFETY STEERING FOR MOTOR VEHICLE
[75] Inventor: Gerhard Schiesterl, Stuttgart, Germany
[73] Assignee: Daimler-Benz Aktiengesellschaft, Germany
[22] Filed: July 9, 1971
[21] Appl. No.: 161,102

[30] Foreign Application Priority Data
July 9, 1970    Germany............................ 2034008

[52] U.S. Cl................................ 280/731; 280/87 R; 280/734
[51] Int. Cl.².......................................... B60R 21/08
[58] Field of Search.................. 280/150 AB, 87 R; 190/78; 200/61.54, 61.55, 61.56; 74/492, 552

[56] References Cited
UNITED STATES PATENTS

| 2,850,291 | 9/1958 | Ziccardi ........................ 280/150 AB |
| 2,894,090 | 7/1959 | Timoff et al. ................. 200/61.54 X |
| 3,450,414 | 6/1969 | Kobori........................... 280/150 AB |
| 3,532,360 | 10/1970 | Leising et al. ................. 280/150 AB |
| 3,540,304 | 11/1970 | Weiss............................. 280/87 R X |
| 3,600,003 | 8/1971 | Carey ............................ 280/150 AB |
| 3,618,981 | 11/1971 | Leising ......................... 280/150 AB |
| 3,632,135 | 1/1972 | Chute et al.................... 280/150 AB |
| 3,657,752 | 4/1972 | Davidson et al. ............................ 9/9 |
| 3,663,035 | 5/1972 | Norton .......................... 280/150 AB |
| 3,680,884 | 8/1972 | Stephenson .................. 280/150 AB |

FOREIGN PATENTS OR APPLICATIONS
609,624   9/1960   Italy............................ 280/150 AB Primary Examiner—Robert R. Song
Assistant Examiner—David M. Mitchell
Attorney, Agent, or Firm—Craig & Antonelli

[57] ABSTRACT

A safety steering for motor vehicles with a plastically deformable deformation member arranged between the steering wheel and the upper end of the steering spindle and with an automatically inflatable gas cushion arranged on the inside of the deformation member which is automatically inflated when the deceleration of the vehicle exceeds a predetermined value.

29 Claims, 2 Drawing Figures

SAFETY STEERING FOR MOTOR VEHICLE

The present invention relates to a safety steering for motor vehicles with a plastically deformable deformation member arranged between the steering wheel and the upper end of the steering spindle.

It is known that steering devices which are equipped with such a deformation member, also referred to as impact pot, contribute considerably toward the protection of the driver during accidents.

In recent times, gas cushions have also been frequently proposed for the protection of the passengers of motor vehicles in case of accidents which upon exceeding a predetermined deceleration of the vehicle are automatically filled and thus prevent in case of a front end collision that the vehicle passengers are thrown in the forward direction.

However, up to the present no sufficient experience exists whether the operability, i.e., the ability to function properly on the part of such types of gas cushions remains preserved in every case even after an operation for a period of several years of a motor vehicle equipped with the same whereas this is the case without limit in connection with the deformation member of the aforementioned type.

The present invention is therefore concerned with the task to render utilizable the advantages of both protective installations, which exist without a doubt, for the driver of a motor vehicle.

A safety steering for motor vehicles with a plastically deformable deformation member arranged between the steering wheel and the upper end of the steering spindle is therefore proposed whereby according to the present invention a conventional gas cushion adapted to be automatically inflated upon exceeding a predetermined deceleration of the vehicle, is arranged on the inside of the deformation member whereby preferably the side of the deformation member facing the driver is closed off by a cover that is adapted to be pushed out by the inflating gas cushion.

A pyrotechnical charge of any conventional known type thereby serves preferably for the purpose of filling the gas cushion which brings about a strong gas formation immediately after the ignition.

In that connection, it is known in the art of pyrotechnics that various components of a charge can be so selected that approximately one liter of gas results from 1 cm³ of charge. With the use of this purely pyrotechnical system for an inflatable gas cushion, a structural volume reduction of about 93% would be attained compared to other systems — for example, those based on taking along compressed gas tanks or containers.

In a preferred embodiment of the present invention, the charge is arranged on the inside of the deformation member, and more particularly preferably at the bottom thereof.

However, it may also be advantageous to arrange the charge outside of the deformation member and to provide openings in the wall of the deformation member for the admission of the gases into the deformation member.

For the protection of the gas cushion against the expanding flame front of the burning charge, the gas cushion should be arranged in a gas-permeable container consisting of fine-mesh wire work or fabric.

Accordingly, it is an object of the present invention to provide a safety steering device for motor vehicles which avoids by simple means the aforementioned shortcomings and drawbacks encountered in the prior art.

Another object of the present invention resides in a safety steering device for motor vehicles which combines the advantages of the deformation member with those of an inflatable cushion arranged in the steering mechanism in front of the driver.

A further object of the present invention resides in a safety steering system of the type described above which is relatively simple in construction, easy to install and involves a relatively small number of parts.

These and further objects, features and advantages of the present invention will become more obvious from the following description when taken in connection with the accompanying drawing which shows, for purposes of illustration only, one embodiment in accordance with the present invention, and wherein.

Figure 1:
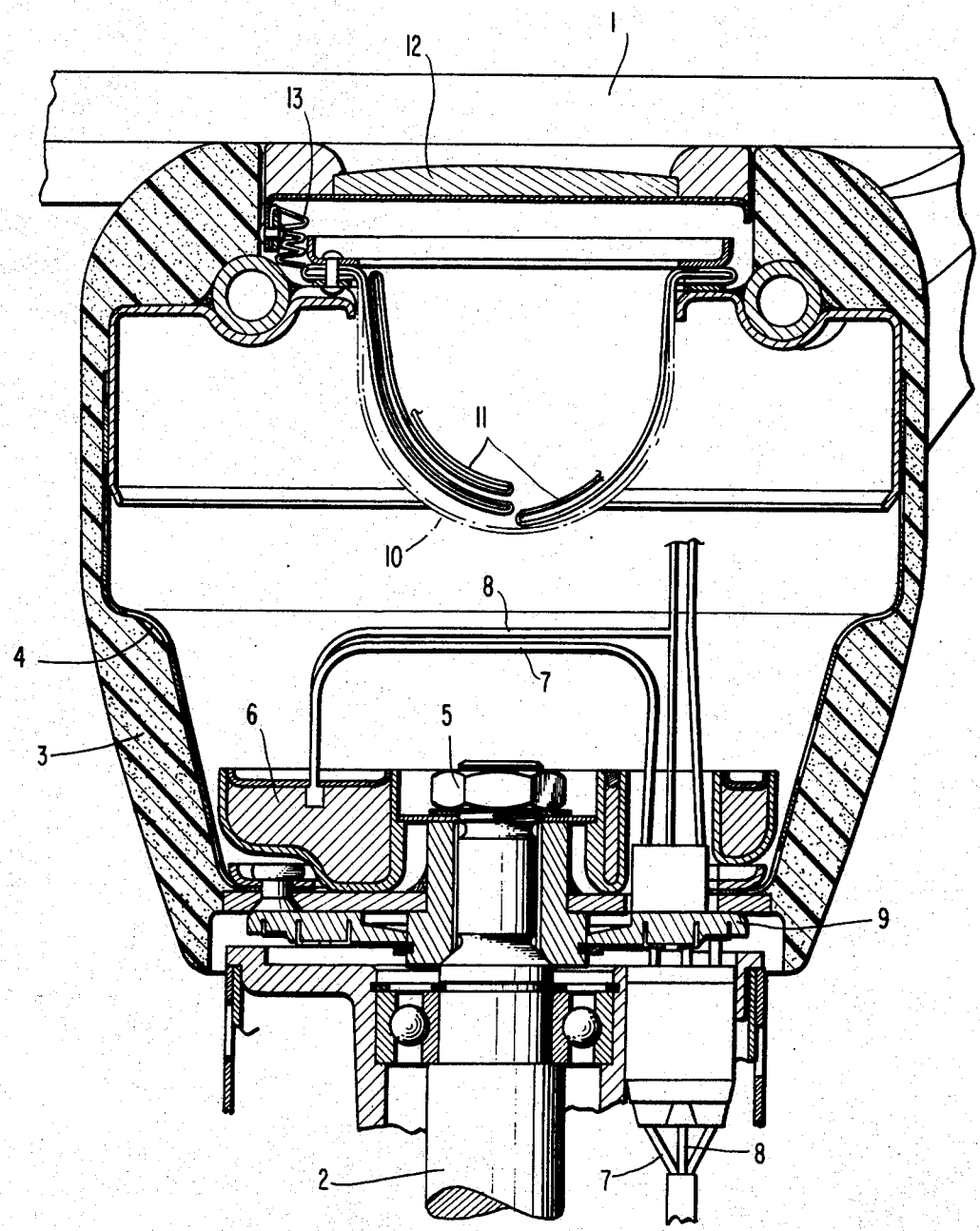
FIG. 1 is a somewhat schematic cross-sectional view through one embodiment of a safety steering device in accordance with the present invention.

Referring now to FIG. 1, this fugure shows a safety steering in which a deformation member 4 consisting of sheet metal and surrounded by a foamed material layer 3 of any conventional type is arranged between the steering wheel 1 and the upper end of the steering spindle 2. A charge 6 which upon ignition produces the gases required for inflating the cushion, is secured at the bottom of the deformation member 4 by means of the steering wheel securing nut 5, the electrical connection of the charge 6 with a deceleration switch of any conventional construction and not illustrated in the drawing, i.e., a so-called sensor, takes place by means of the lines 7 and 8 by way of the steering wheel slip ring 9.

Current flows through these lines 7 and 8 as soon as the deceleration of the vehicle exceeds a predetermined value, and the charge 6 is ignited thereby.

A container 10 consisting of a fine-mesh wire work or fabric, which accomodates the folded-together gas cushion 11, is secured in a recess of the oppositely disposed bottom of the deformation member 4. This container 10 has the task to protect the deformation member 4 against the flame front of the burning charge 6 without thereby losing its gas permeability. Furthermore, this container 10 has the advantage that it can be compressed with slight forces which is necessary for the function of the deformation member 4 by itself — in case the gas cushion system should not function at some date. Thus, the deformation member 4 is not impaired in its function by the slight structural height of the charge 6.

Figure 2:
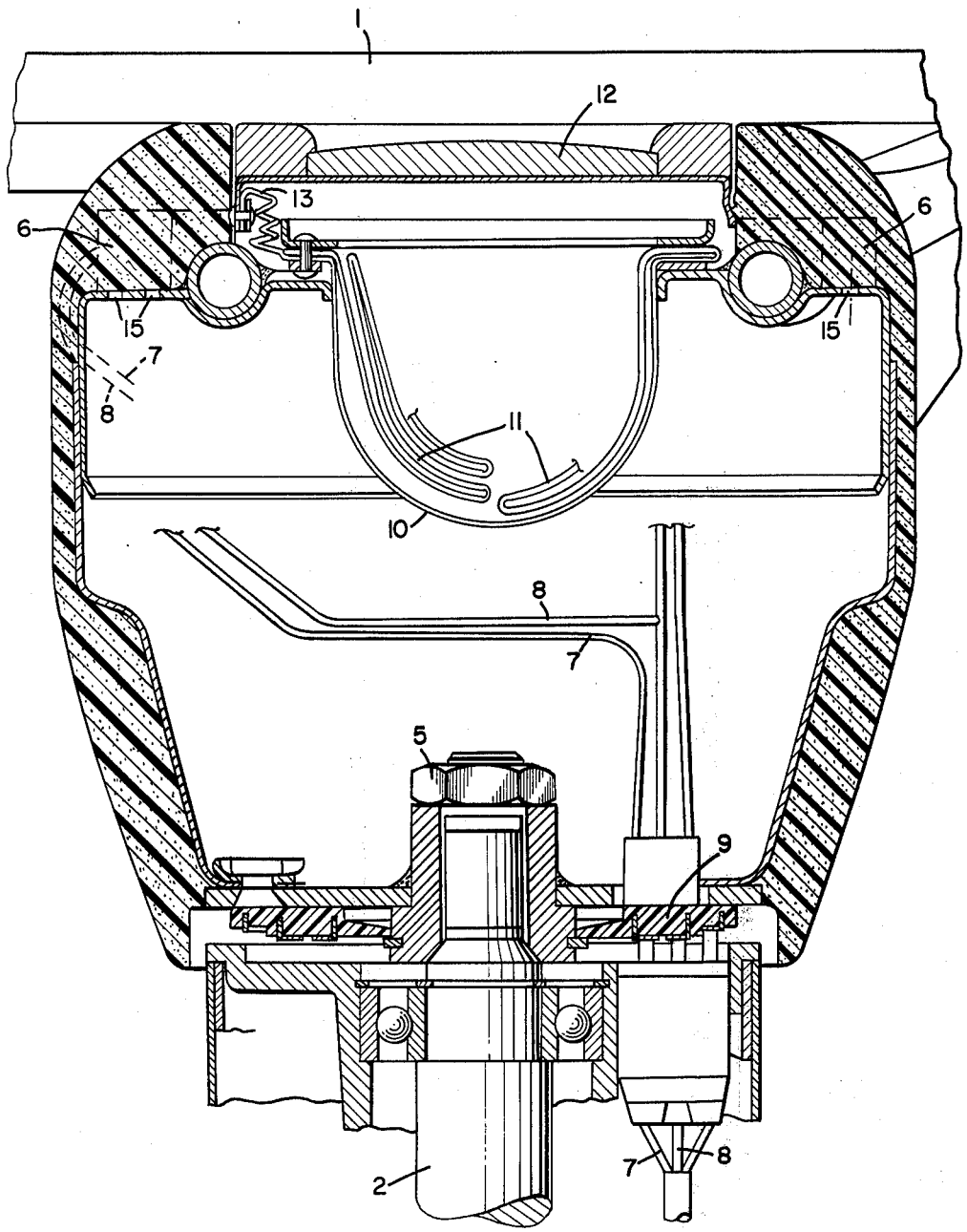
FIG. 2 is a somewhat schematic cross-sectional view through another embodiment of a safety steering device in accordance with the present invention.

A cover 12 forms the closure at the steering wheel 1, which is retained in the steering wheel 1, for example, by means of spring clips 14, as shown in FIG. 2. This cover 12 is connected on one side with the container 10 by way of an elastic fabric or a film 13. However, the fabric of the gas cushion with a special cut may, of course, also be utilized for that purpose. This fabric strip 13 exerts a unilateral pull on the cover 12 after the cover 12 has been pushed out by the gas pressure, whereupon the cover 12 has been pushed out by the gas pressure, whereupon the cover 12 pivots to the side 10 (due to the practically frictionless joint) and the gas cushion can unfold as a result of the gas pressure.

OPERATION

The installation according to the present invention operates as follows:

In case of a front end collision, a sensor or feeler of conventional construction closes the energizing circuit including lines 7 and 8 beginning with a predetermined deceleration value and ignites the charge 6 at the bottom of the deformation member 4. As a result of the now occurring pressure the gas cushion 11 is now pressed outwardly against the cover 12 until the latter snaps out of its mounting and pivots away upward laterally. The gas cushion 11 can now be blown out and is inflated. The time from the response of the sensor up to the full inflation of the gas cushion 11 must be less than 0.05 seconds.

If now a human body impinges against the gas cushion, energy is dissipated and decreased by a defined escape of the gas out of the gas cushion 11 by conventional gas pressure release means (not shown). If this energy decrease is still not sufficient, the deformation member 4 becomes operable subsequent thereto.

A further possibility resides in the mounting of charge containers 6 outside of the deformation member 4, as shown in FIG. 2 for instance, between or in the spokes of the steering wheel. In that case the upper portion of the deformation member 4 which is not utilized for the form-charge work in case of an accident, may be provided with a number of bores 15 through which the gas resulting after ignition of the charge can flow into the deformation member.

Of course, to the extent that spatial conditions permit the same, it is also possible to ready the gas necessary for the filling of the gas cushion in some other way, for instance, by taking along compressed gas or by evaporation of liquid gas.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A safety steering for motor vehicles with a plastically deformable deformation member arranged between a steering wheel and the upper end of a steering spindle, characterized in that a gas cushion means automatically inflatable upon exceeding a predetermined deceleration of the vehicle is arranged on the inside of the deformation member.

2. A safety steering according to claim 1, characterized in that the side of the deformation member facing the driver is closed by a cover means adapted to be pushed out by the inflating gas cushion means.

3. A safety steering according to claim 2, characterized in that a pyrotechnical charge means is provided for the filling of the gas cushion means which effects a strong gas formation directly after the ignition thereof.

4. A safety steering according to claim 3, characterized in that the charge means is arranged on the inside of the deformation member.

5. A safety steering according to claim 4, characterized in that the charge means is arranged at the bottom of the deformation member.

6. A safety steering according to claim 3, characterized in that the charge means is arranged on the outside of the deformation member and that aperture means are provided in the wall of the deformation member for the admission of the gases into the deformation member.

7. A safety steering according to claim 3, characterized in that the gas cushion means is protected against the flame front of the pyrotechnical charge means by a container consisting of fine-mesh wire fabric.

8. A safety steering for motor vehicles with a plastically deformable deformation member arranged between a steering wheel and the upper end of a steering spindle, characterized in that a gas cushion means automatically inflatable upon exceeding a predetermined deceleration of the vehicle is arranged on the inside of the deformation member, wherein the side of the deformation member facing the driver is closed by a cover means adapted to be pushed out by the inflating gas cushion means; a pyrotechnical charge means is provided for the filling of the gas cushion means which effects a strong gas formation directly after the ignition thereof, said gas cushion means being protected against the flame front of the burning pyrotechnical charge means by a container consisting of a fine-mesh wire fabric; and means for retaining said cover means are provided to retain said cover means at a position at one of the two parts consisting of deformation member and steering wheel when said cover means is pushed out by said inflating gas cushion means.

9. A safety steering according to claim 8, characterized in that said means for retaining said cover means is a fabric strip means.

10. A safety steering according to claim 8, characterized in that at least the side of the cover means disposed opposite said means for retaining is held by way of readily detachable spring clamp means.

11. A safety steering according to claim 10, characterized by means for conducting the ignition current from a deceleration switch to the charge means by way of steering wheel slip ring means.

12. A safety steering according to claim 11, characterized in that said means for retaining said cover means is a fabric strip means.

13. A safety apparatus for a vehicle of the type having a steering wheel arranged at a passenger facing end of a steering spindle, said apparatus comprising:
a plastically deformable deformation member positioned between the steering wheel and the passenger facing end of the steering spindle,
a gas cushion means being disposed inside the deformation member, said gas cushion means automatically inflatable by gas upon exceeding a predetermined deceleration member, and
means for enabling the escape of a predetermined amount of gas from said gas cushion means to dissipate impact energy, said deformation member and gas cushion means being arranged such that said deformation member dissipates impact energy in excess of the impact energy dissipated by the predetermined amount of gas escape from said gas cushion means.

14. A safety apparatus according to claim 13, wherein said gas cushion means is contained inside said deformation member when said gas cushion means is in an uninflated condition.

15. A safety apparatus according to claim 14, wherein a pyrotechnic charge means inflates said gas cushion means with gas upon ignition of said charge means.

16. A safety apparatus according to claim 13, wherein a cover means is positioned on the passenger facing side of said deformation member to enclose said gas cushion means in an uninflated condition inside said deformation member, said cover means being adapted to be pushed out from said deformation member upon inflation of said gas cushion means.

17. A safety apparatus according to claim 16, further comprising means for retaining said cover means at a position at one of the two parts consisting of deformation member and steering wheel when said cover means is pushed out by said inflating gas cushion means.

18. A safety steering according to claim 17, characterized in that said means for retaining said cover means is a fabric strip means.

19. A safety steering according to claim 18, characterized in that at least the side of the cover means disposed opposite said means for retaining is held by way of readily detachable spring clamp means.

20. A safety steering according to claim 13, further comprising a pyrotechnical charge means for inflating said gas cushion means, characterized in that the gas cushion means is protected against the flame front of said pyrotechnical charge means by a container consisting of fine-mesh wire fabric.

21. A steering wheel safety device for vehicles comprising a plastically deformable deformation member positioned between a steering wheel and a passenger facing end of a steering spindle, and a gas cushion means automatically inflatable upon exceeding a predetermined deceleration of a vehicle disposed inside the deformation member.

22. A safety device according to claim 21, wherein a cover means, adapted to be pushed out by the inflating gas cushion means, covers said deformation member.

23. A safety device according to claim 21, wherein said gas cushion means is filled by gas formed from ignition of a pyrotechnic charge means.

24. A safety device according to claim 23, wherein the charge means is disposed inside the deformation member.

25. A safety device according to claim 24, characterized in that the charge means is arranged at the bottom of the deformation member.

26. A safety device according to claim 23, further comprising means in the wall of the deformation member for admission of gases into the deformation member, said charge means being disposed exteriorly of said deformation member.

27. A safety device, according to claim 23, further comprising container means including fine-mesh wire fabric for protecting said gas cushion means from the flame front of said charge means.

28. A safety device according to claim 23, further comprising means for conducting ignition current from a deceleration switch to said charge means through a steering wheel slip ring means.

29. A steering wheel safety device for vehicles comprising a plastically deformable deformation member positioned between a steering wheel and a passenger facing end of a steering spindle; a gas cushion means automatically inflatable upon exceeding a predetermined deceleration of a vehicle disposed inside of the deformation member, wherein a cover means adapted to be pushed out by the inflating gas cushion means, covers said deformation member; and means for retaining said cover means at a position at one of the two parts, including said deformation member and said steering wheel, when said cover means is pushed out by said inflating gas cushion means.

* * * * *